United States Patent [19]

Houben et al.

[11] 4,007,625
[45] Feb. 15, 1977

[54] FLUIDIC OSCILLATOR ASSEMBLY

[75] Inventors: Heinz Houben, Monchen-Gladbach; Manfred Pabst, Weiden near Cologne, both of Germany

[73] Assignee: A. Monforts, Monchen-Gladbach, Germany

[22] Filed: July 14, 1975

[21] Appl. No.: 595,481

[30] Foreign Application Priority Data

Oct. 12, 1974 Germany ............................ 2448783
July 13, 1974 Germany ............................ 2433765

[52] U.S. Cl. .................................. 73/23; 137/804
[51] Int. Cl.² ........................................... G01N 9/00
[58] Field of Search .......... 73/23, 30, 32 A, 194 B, 73/339 A, 357; 137/804, 805, 826, 835

[56] References Cited

UNITED STATES PATENTS

| | | | |
|---|---|---|---|
| 3,111,931 | 11/1963 | Bodine | 137/835 X |
| 3,204,652 | 9/1965 | Bauer | 137/826 |
| 3,273,377 | 9/1966 | Testerman et al. | 73/23 X |
| 3,373,600 | 3/1968 | Taplin | 73/32 |
| 3,452,771 | 7/1969 | Kirshner et al. | 137/835 X |
| 3,600,612 | 8/1971 | Beeken | 73/194 |
| 3,748,502 | 8/1971 | Bernstein | 73/194 X |

*Primary Examiner*—Herbert Goldstein
*Attorney, Agent, or Firm*—Herbert L. Lerner

[57] ABSTRACT

A fluidic oscillator assembly including a fluidic oscillator having an inlet and two outlets, and a piezoelectric element for picking-up frequency oscillations induced in the fluid oscillator, the piezoelectric element being located at and closing one of the outlets of the fluidic oscillator.

5 Claims, 6 Drawing Figures

FLUIDIC OSCILLATOR ASSEMBLY

The invention relates to an assembly of a fluidic oscillator with a piezoelectric element, such as a quartz crystal, for receiving or picking-up the oscillating frequency of the fluidic oscillator. The invention further relates to a device employing such fluidic oscillator for determining the mixing ratio of binary gases by measuring the velocity of sound in a mixture of the gases, that velocity being determined through the oscillating frequency.

A method of establishing the mixing ratio of binary gases by determining the velocity of sound in a mixture of the gases through the oscillating frequency of a fluidic oscillator has been disclosed heretofore in German Published Non-prosecuted application DT-OS-2,142,919. In that disclosure, the reception or pick-up of the oscillator frequency by a quartz crystal is also taught. The measurement apparatus of the foregoing German published application forms part of a control system for adjusting the mixing ratio of two or more gases in a treatment chamber.

As is generally known, the velocity of sound in a gas is dependent upon the respective type or composition of the gas. If the sound propagation is considered to be substantially an adiabatic process and if the air (hereinafter considered to be a gas), as well as superheated steam at normal pressure and temperatures of 0° to 300° C are considered to be substantially ideal gases, then the respective velocities of sound in gases at the same temperature are dependent upon the different respective mole weights and polytropic-exponents. The polytropic-exponent is the quotient of the specific heat at constant pressure and of the specific heat at constant volume. In a gas mixture, the mutually intermixed gases, of course, have the same temperature. The respective sound velocities $a_1$ and $a_2$ of two gases therefore depend upon the following relationship of the mole weights $M_1$ and $M_2$ and of the polytropic exponents $K_1$ and $K_2$ of the gases:

$$\frac{a_1}{a_2} = \sqrt{\frac{M_2 \cdot K_1}{M_1 \cdot K_2}}.$$

AS shown hereinafter in the plot diagram of FIG. 1, the velocity of sound $a$ in meters per second of an air-water vapor mixture is a function of the water-vapor concentration $x$ in this mixture for different temperatures ($t_1 = 100°$ C $= 373°$ K $t_2 = 150°$ C $= 423°$ K, and $t_3 = 200°$ C $= 473°$ K). For example, it can be concluded from FIG. 1 that the difference of the velocity of sound in steam with respect to that in air at a temperature of 200° C is approximately 23%.

For gases differing more sharply in respective molecular weights, such as most organic solvents in air, for example, these differences can become considerably greater. Thus the ratio of the velocity of sound in air to that in perchlorethylene, for example, is 2.68 : 1. With mixtures of two gases, as shown in FIG. 1, the velocity of sound, in accordance with the mixing ratio, lies between the indicated or given limits, thus, for example, between $1a_o$ and $1.23a_o$ for air-water vapor or between $1a_o$ and $2.68a_o$, for air-perchlorethylene, where $a_o$ is the velocity of sound in air, for example.

Since a close connection or correlation exists between the mixing ratio and the velocity of sound in that mixture, the temperature or climate of the chamber of a machine is then determinable or controllable with the air of measurements of the velocities of sound.

Fluidic oscillators (wall attachment fluidic elements), making use of the so-called Coanda effect, are particularly suitable for the measurement of the velocity of sound in a gas mixture, since they are usable over a broad temperature range, are practically inertialess and can therefore form a direct part of an automatic system for controlling the mixture. As is generally known, the frequency of fluidic oscillators is dependent upon i.e. a function of, the temperature (H. J. Tafel, "Analog or digital signalling technique in fluidics?,"a paper presented at the technical conference on oil hydraulics and pneumatics, Hannover Fair 1971, Conference Report Volume, especially pages 126 to 131). This dependence results from the different densities of the gases at different temperatures. The frequency of these oscillators is thereby dependent upon the velocity of sound in the gas (besides the geometry of the oscillator proper). The composition of the mixture, such as an air-water vapor mixture, for example, can thereby be determined from the oscillating frequency of a fluidic oscillator.

The reception or pick-up of a signal transmitted from a fluidic oscillator may be difficult, however, especially if it involves analog signals. When crystal oscillators are used to pick-up or detect the signals, they are often installed at one of the outlets of the fluidic oscillators (note the article by G. Walliser entitled "Fluidics for governors and control systems" in the technical journal "Steuerungstechnik" Vol. 5, 1972, Nos. 9/10 pages 226, 227). The demands imposed on the succeeding amplifiers as well as on the filtering-out of disruptive effects are very serious indeed. It is therefore an object of the invention so to dispose the quartz crystal for receiving the oscillating frequency that the strongest possible signal is received.

With the foregoing and other objects in view, there is provided, in accordance with the invention, a fluidic oscillator assembly comprising a fluidic oscillator having an inlet and two outlets, and a piezoelectric element for picking-up frequency of oscillations induced in the fluidic oscillator, the piezoelectric element being located at and closing one of the outlets of the fluidic oscillator. This permits pick-up and further transmissioner of practically the entire signal amplitude by the quartz crystal oscillator. Although one of the outlets of the fluidic oscillator is closed off by the quartz crystal oscillator, according to the invention no change occurs in the operation of the fluidic oscillator.

Furthermore, when a fluidic oscillator is used to determine the mixing ratio of binary gases, in accordance with another feature of the invention, the outlet closed off by the oscillating quartz crystal extends out of i.e. is located outside of the chamber containing the mixture that is to be measured. This feature is particularly advantageous when the gases to be mixed are relatively hot, since a ceramic quartz crystal can then be employed which, although only usable up to a temperature of about 120° C, is much less costly than a crystalline oscillating quartz crystal. Such a ceramic quartz crystal is preferably also elastically mounted, for example in silicon-rubber, in order to eliminate further disturbances. If very small signals are to be picked up or received with the fluidic oscillator according to the invention, it is further advantageous to provide a preamplifier directly coupled to the crystal oscillator, and then transmit the preamplified signal to a control circuit remote therefrom.

Other features which are considered as characteristic for the invention are set forth in the appended claims.

Although the invention is illustrated and described herein as embodied in a fluidic oscillator, it is neverthless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings in which.

Figure 1:
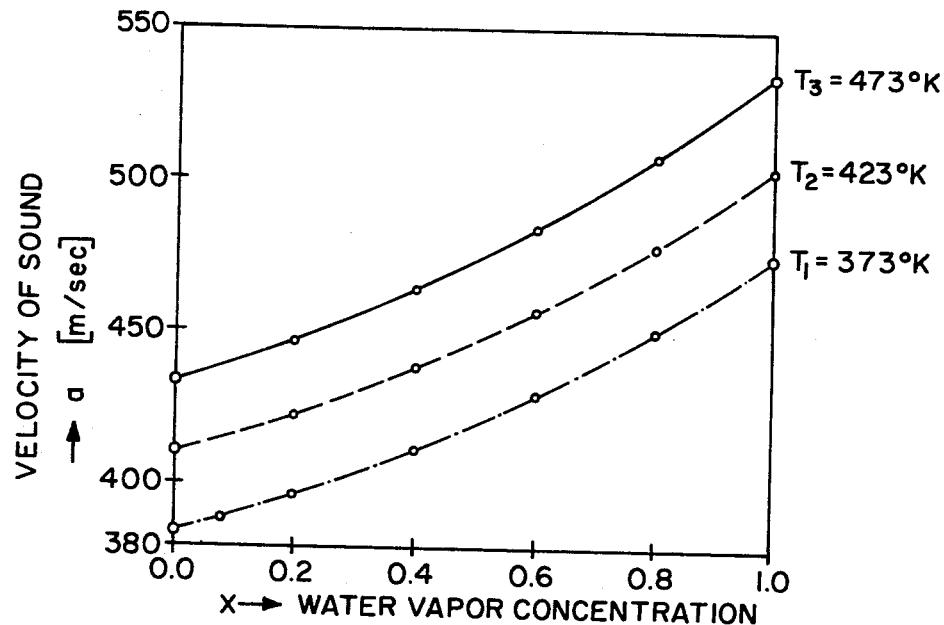
FIG. 1 is a plot diagram showing the velocity of sound in an airwater vapor mixture as a function of a water-vapor concentration for various temperatures.
Figure 2:
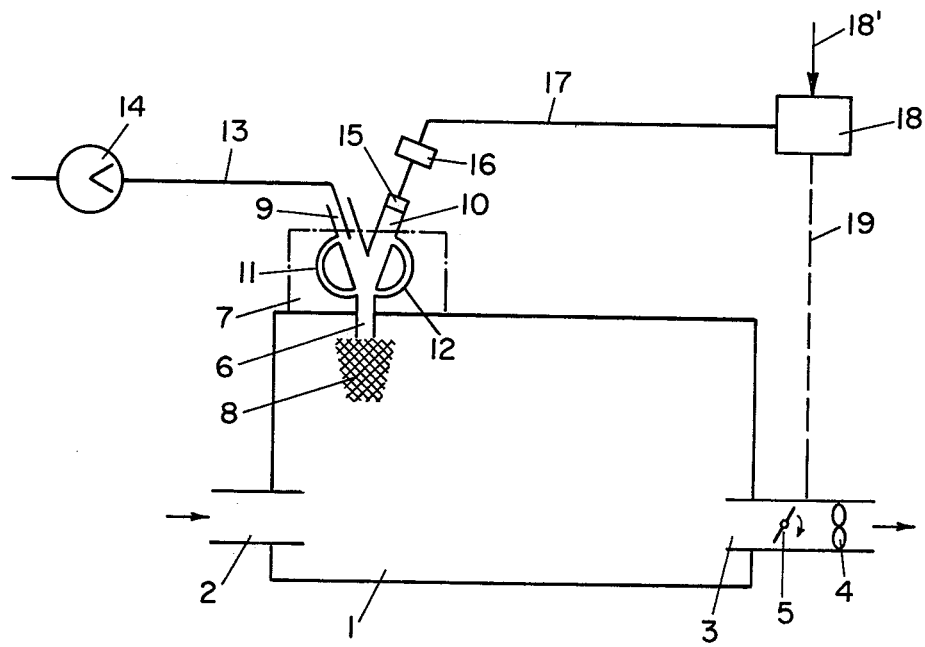
FIG. 2 is a block circuit-diagram of a fluidic oscillation assembly according to the invention.

FIG. 1 has been described hereinbefore; reference is now being made to the remaining figures of the drawing and first, particularly, to FIG. 2 thereof.

FIG. 2 shows how the mixing ratio of a gas mixture in a processing chamber can be determined and controlled by measuring the velocity of sound by means of a fluidic oscillator assembly.

It is assumed that the gas mixture ratio in a chamber 1 in FIG. 2 is to be measured or controlled. The chamber 1 is formed with an inlet 2 for one or more components of the gas mixture and a discharge opening or outlet 3 with a suction fan 4 and a throttle or butterfly valve 5. By an adjustment of the fan 4 or of the throttling valve 5, it is possible to regulate the gas mixing ratio in the chamber 1 by more or less intensely sucking-out and sucking-in the gases through the inlet 2.

An inlet nozzle 6 of a fluidic oscillator 7, which is preferably provided with a filter 8 disposed in advance or upstream thereof, projects into the chamber 1. The fluidic oscillator 7 is provided with two feedback lines or channels 11 and 12 respectively extending back to the inlet 6 from the outlets 9 and 10. A suction line or conduit 13 of a suction pump 14 is connected to the outlet 9 of the fluidic oscillator 7. It is advantageous to use a suction pump 14 in lieu of the otherwise conventional connection of a pressure pump to the inlet of a fluidic oscillator, because a suction pump can readily be disposed outside the chamber 1, which may be filled with hot gases under certain circumstances.

The signal provided from the fluidic oscillator 7 is received, according to the invention, by a piezoelectric element such as an oscillating crystal 15 closing off the outlet 10 of the fluidic oscillator 7, and is further transmitted through a preamplifier 16, which is directly coupled to the oscillating quartz element 15 immediately following the same. The signal is then fed from the preamplifier 16 along an operating line 17 wherein, if necessary, certain disturbances may be deleted, until it reaches a control unit or system 18 wherein the actual value of a signal is compared with a nominal value thereof delivered from a conventional source through a line 18', and the resulting error signal is then fed through a line 19 to the suction or exhaust fan 4 or the throttle valve 5, so that the mixing ratio in the chamber 1 is readjusted in a desired manner.

Figure 3:
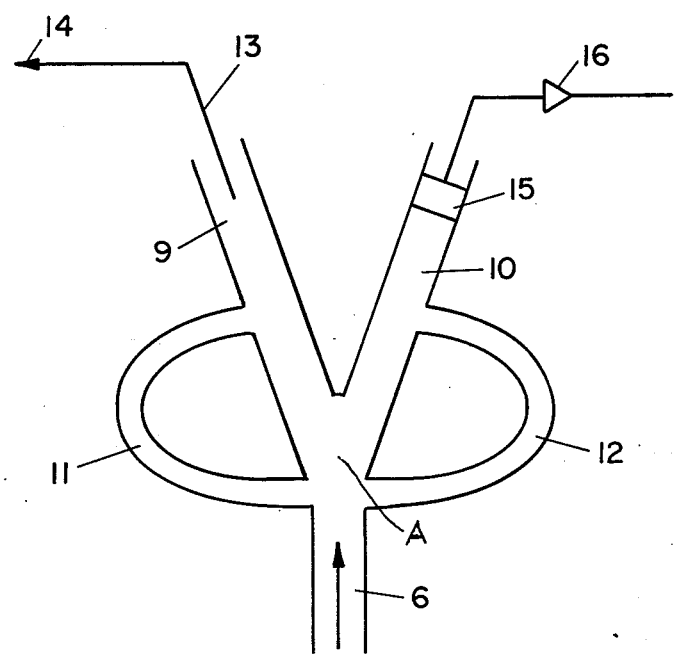
FIG. 3 is an enlarged diagrammatic view of the fluidic oscillator of FIG. 2, showing the operating principle thereof.

FIG. 3 shows in enlarged view the fluidic oscillator 7 according to FIG. 2, similar parts of the fluidic oscillator having the same reference numerals in both figures. The fluidic oscillator 7 has two external feedback lines or channels 11 and 12. The fluidic oscillator has been developed in principle from a bistable wall-attachment fluidic element (Wandstrahlelement). Two stable flow conditions exist. A wall attachment fluidic element of this kind is constructed from a level or smooth diffuser 6, which is divided by a wedge downstream from the inlet thereto into two channels 9 and 10. Due to the wall attachment fluidic effects of the diffusing walls, the main stream or flow of gas can attach itself stably to one wall or the other i.e. to the wall opposite the wedge in channel 9 or channel 10, and thus flow out of one of the two channel outlets 9 and 10. In FIG. 3, both of the channel outlets 9 and 10 are shown connected with the inlet opening 6, so that a feedback oscillator is thereby formed. If the main flow leaps from one to the other channel outlets 9 or 10, a pressure pulse is returned through the respective one of the feedback lines 11 and 12 to the control inlet 6 which switches the main flow automatically to the other or remaining channel outlet and this operation is then repeated; thus a self-oscillation is excited therein.

As a main gas flow travels from the inlet 6 to the outlet 9, a feedback gas flow is formed in the feedback channel 11 traveling in direction back to the inlet channel 6 and diverts the main gas flow from travel towards the outlet 9 to travel towards the outlet 10. As the main gas flow now travels towards the outlet 10, a feedback gas flow is formed in the feedback channel 12 back to the inlet 6 which, when impinging upon the main gas flow, again diverts the latter back to travel towards the outlet 9.

Obviously, the diverting period is equal to the time required by the gas flow to travel from the diverting location A at the intersection of the outlet channels 9 and 10, into and along the respective outlet channel and return through the respective feedback channel to the diverting location A. Since the wave front of the gas flow expands with the vlocity of sound, the aforementioned time period is proportional to the velocity of sound. At constant temperature, however, the velocity of sound is proportional to the density and thereby to the mixing ratio of the gas flowing through the fluidic oscillator.

In accordance with the invention, the one outlet 10 of the fluidic oscillator is closed by the quartz crystal 15. Thus, a gas flow cannot travel through this outlet 10, however, pressure shocks or jolts become perceptible in the channel leading to this outlet 10, which are transmitted through the feedback channel 12 and thereby causes the fluidic oscillator to oscillate. Through the pressure jolts, a charge displacement or shift is produced due to the effect of mechanical pressure in the pressure-sensitive quartz crystal 15 i.e. a so-called piezoelectric crystal, which has two non-illustrated electrodes. This charge displacement or shift produces a voltage or voltage surges (at the frequency of the fluidic oscillator) between both electrodes.

In the invention of the instant application, the velocity of sound per se is not measured but, rather, the frequency of the fluidic oscillator which depends upon or is a function of the velocity of sound. Since the velocity of sound, namely, (at constant pressure) is proportional to the density of a binary gas mixture, the measured frequency must also be proportional to this density. The frequency of the fluidic oscillator, naturally depends upon the length of the feedback channels (besides depending upon the temperature and the density). During operation and for one and the same fluidic oscillator, this length is constant, however; then the output signal of the fluidic oscillator is dependent only upon the velocity of sound and the density and the temperature of the gas flowing through the oscillator.

Figure 4:
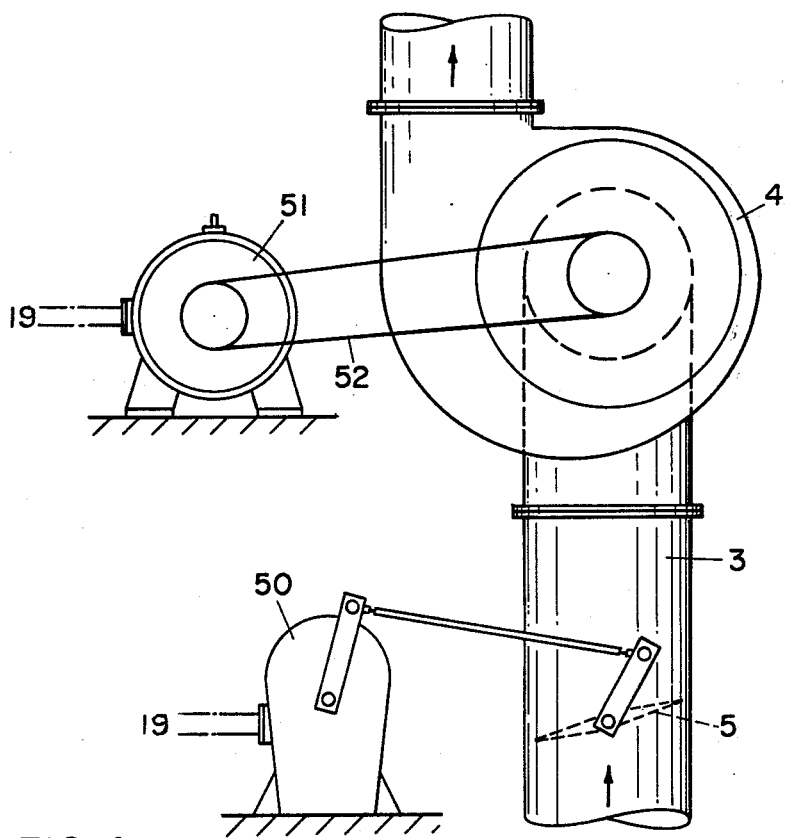
FIG. 4 is a fragmentary diagrammatic elevational view of the fluidic oscillator assembly of FIG. 2 showing details of construction of the exhaust fan and throttle thereof.

In FIG. 4, details of the construction of the exhaust fan 4 and the throttle valve 5 of FIG. 2 are shown. A drive motor 51 which is connected to an electric voltage or current supply by leads 19 coming from the control unit 18 (FIG. 2) drives the exhaust fan 4 by means of a belt 52 when responsive to the control unit 18. The throttle 5 disposed in the conduit 3 is positioned by means of a servo-motor 50 which may be connected to the electric supply through the same leads 19 extending from the the control unit 18. The throttle 5 disposed in the conduit 3 is positioned by means of a servo-motor 50 which may be connected to the electric supply through the same leads 19 extending from the control unit 18. The flow of gas from the chamber 1 (not shown in FIG. 4) passes through the conduit 3 in accordance with the suction pressure provided by the fan 4 and/or in accordance with the flow cross section in the conduit 3 adjusted by the throttle 5, as controlled by the control system 18 of FIG. 2.

Figure 5:
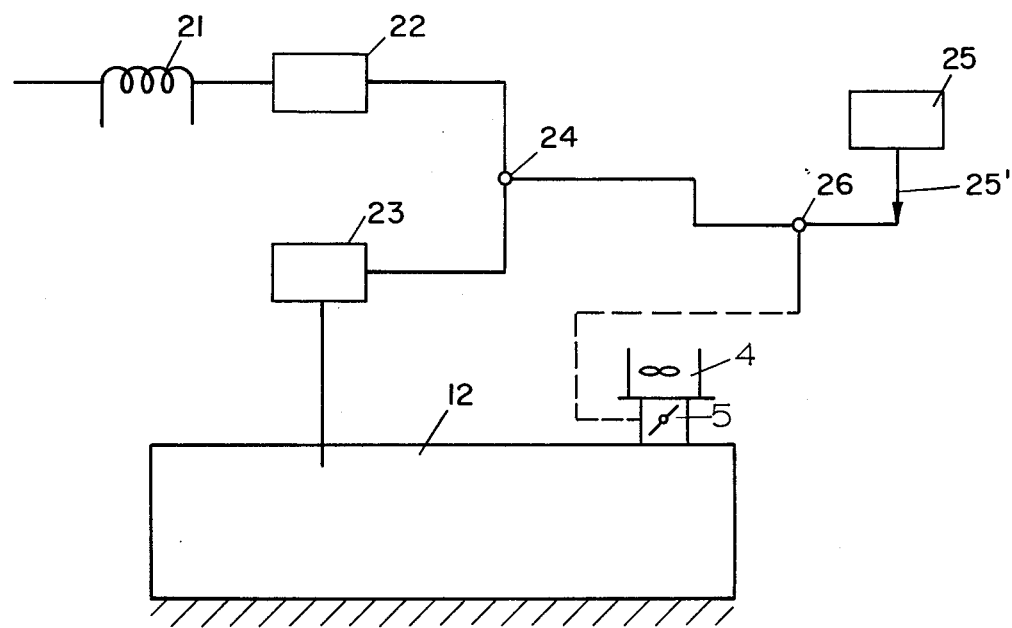
FIG. 5 is a block circuit diagram of a modified embodiment of the invention.
Figure 6:
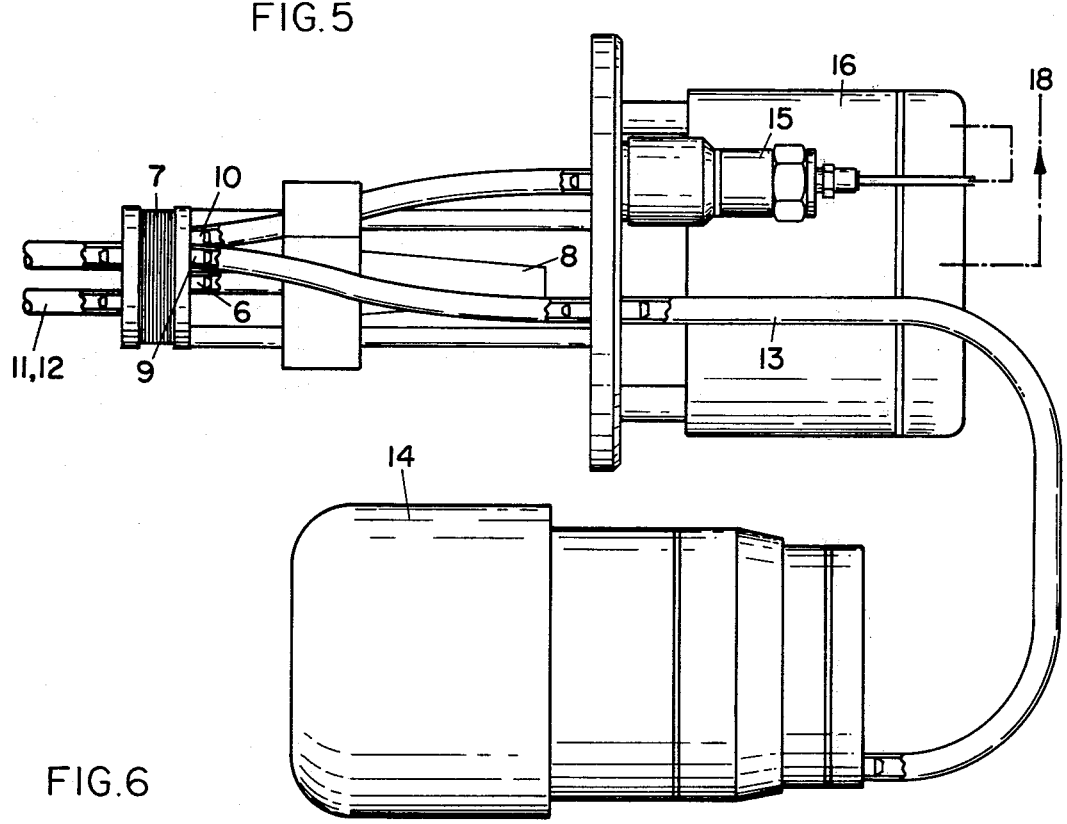
FIG. 6 is an elevational view of several structural components of the fluidic oscillator assembly of the invention.

Another embodiment of the fluidic oscillator assembly of the invention is shown in FIG. 5. The velocity of sound in dry air that is heated in an air-heater 21 to a temperature T of a gas mixture in a chamber 12 is measured in one fluidic oscillator 22. The velocity of sound of the gas mixture from the chamber 12 is additionally measured in a second fluidic oscillator 23, the temperature T being the same therein. The results of those sound velocity measurements are compared by a conventional comparator device at 23 and the resultant velocity difference of the sound velocity in air and the velocity in the gas mixture at the same temperature is compared at a comparator device 26 to a nominal value 25' provided by a device 25. Any resulting error is then used to control either the throttle 5 or the exhaust fan 4. Structural details of a fluidic oscillator assembly according to the invention are shown in FIG. 6, the reference numerals for the features shown in FIG. 6 being the same as for the corresponding features shown diagrammatically in FIG. 2.

The oscillating frequency is a function of the length of the feedback lines or channels 9, 10 and the velocity of propagation of the signal. Since pressure pulses in gases are propagated at the velocity of sound, and the velocity of sound is, amongst other factors, dependent upon the density of the medium, the frequency of oscillation of the fluidic oscillator is a measure of the density of the gses flowing therethrough.

There is claimed:

1. A fluidic oscillator assembly comprising a fluidic oscillator having an inlet and two outlets, and a piezoelectric element for detecting frequency of oscillations induced in said fluid oscillator, said piezoelectric element being located at and closing one of said outlets of said fluidic oscillator.

2. A fluidic oscillator assembly according to claim 1 wherein said piezoelectric element is a quartz crystal.

3. A fluidic oscillator assembly according to claim 1 for determining the mixing ratio of binary gases in a mixture thereof by measuring the velocity of sound in the gas mixture, said velocity being determined through the oscillating frequency of the fluidic oscillator, wherein said one outlet of the fluidic oscillator closed by said piezoelectric element extends out of a chamber in which the gas mixture is receivable.

4. A fluidic oscillator assembly according to claim 2 wherein said piezoelectric element is formed of ceramic material and is elastically mounted.

5. A fluidic oscillator assembly according to claim 1 including a preamplifier directly connected to said piezoelectric element in the immediate vicinity of said fluidic oscillator, and control means remote from said fluidic oscillator and connected to said preamplifier.

* * * * *